United States Patent Office 3,336,274
Patented Aug. 15, 1967

3,336,274
HIGHLY CRYSTALLINE TERPOLYMERIC AND QUATERPOLYMERIC POLYSULFONES
Edward A. Youngman, Lafayette, Ronald S. Bauer, Orinda, and Howard V. Holler and Hans E. Lunk, Oakland, Calif., assignors to Shell Oil Company, New York, N.Y., a corporation of Delaware
No Drawing. Filed Feb. 11, 1965, Ser. No. 432,942
8 Claims. (Cl. 260—79.3)

This invention relates to novel polysulfones and more particularly to stable, high molecular weight and highly crystalline polysulfones.

There has been in the past some interest in polysulfones in the preparation of fibers and other commercially useful products. However, these polysulfones have failed to be of commercial value, undoubtedly because of their high costs and/or poor characteristics and properties. The polysulfones have generally been prepared by oxidizing polythioethers or by copolymerizing unsaturated hydrocarbons and sulfur dioxide.

Polysulfone preparation by the former route requires production of polythioethers by reacting dimercaptides with non-conjugated diolefins or with dihalides. However, these reactions require the use of high purity monomers which at best produce polythioethers of relatively low molecular weights. Additionally, complete oxidation of the latter to the corresponding polysulfones has not been attained due to solubility and degradation problems. Thus, polysulfones prepared by this route have poor stability and color characteristics which are apparently due to the presence of intermediate polysulfoxides caused by incomplete oxidation and are thereby quite unsuitable for the manufacture of textiles and the like.

The other method most utilized for preparing polysulfones is that of copolymerizing an unsaturated hydrocarbon monomer and sulfur dioxide. A variety of monoolefinic hydrocarbons have been used such as ethylene, propylene, 1- and 2-butene, isobutylene, pentenes, cyclohexene, etc. The resulting polysulfone materials are alternating 1:1 copolymers having a repeating structural unit

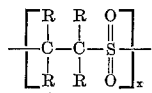

where R may be hydrogen or a hydrocarbyl group and $x$ is an average number which may be quite large.

Although some of these monoolefin-$SO_2$ copolymeric sulfones are of high molecular weight, the repeating structural unit has inherent deficiencies. Such copolymers are severely and rapidly degraded by even the mildest bases such as soaps and organic commercial detergents. They also undergo rapid thermal degradation at moderate temperatures, thereby reverting to the starting hydrocarbon monomers and sulfur dioxide. In addition, with the exception of the ethylene-$SO_2$ copolymer, these materials have poor crystallinity or they are amorphous. Where high molecular weight, stable and highly crystalline products are desired, such as in the preparation of molded materials, films, fibers and the like, these above-mentioned polysulfones are obviously inferior and unsatisfactory.

On the other hand, products obtained by copolymerizing butadiene and $SO_2$ have high molecular weights, high melting points and very high crystallinity while certain other diolefins yield copolymers which are poorly crystalline or amorphous or have low melting points. These unsaturated diene polysulfones, however, also possess properties which make them generally unsuitable for many desired uses. In order to produce useful products from resinous materials of this type, it is necessary to heat them to a plastic or liquid state or to prepare solutions of them such as in preparation of moldings or castings or in the melt or solution spinning of fibers and the like. However, the unsaturated diene polysulfones are thermally unstable and when heated to their flow temperatures they rapidly decompose to their monomeric materials, e.g., butadiene and sulfur dioxide. In addition they are severely degraded by bases. As a result of this instability of the unsaturated polysulfones of this type known heretofore, no practical fabrication methods are known and they have no practical utility.

It is an object of this invention to provide novel stable polysulfones having high molecular weight and high crystallinity. These and other objects will become apparent and better understood from the following disclosure.

It has now been discovered that butadiene, $SO_2$ and isoprene and/or piperylene can be terpolymerized and quater-polymerized to form polysulfones which have high molecular weights and which are soluble at temperatures well below the temperature at which they will decompose. It has also been discovered that solutions or swollen suspensions of these unsaturated polysulfones may be readily hydrogenated to form stable polysulfones of high crystallinity and stability which may be utilized for a number of plastics applications and especially in the spinning of fibers and manufacture of films.

In preparing the unsaturated polysulfones, the polymerization reactions are catalyzed by a free radical initiator such as peroxides, azo compounds or inorganic oxidizing agents which react with sulfur dioxide to yield a redox initiator system. Some specific examples include hydrogen peroxide, benzoyl peroxide, cumene hydroperoxide, di-tert-butyl-peroxide, ascaridole, tert-butyl hydroperoxide, acetyl peroxide, peracetic acid, silver nitrate, lithium nitrate, ammonium nitrate, as well as chlorates, perchlorates, nitrites, persulfates, trimethylamine oxide, dimethylaniline oxide, nitric oxide, nitrogen dioxide, perchloric, nitric and nitrous acids, diisobutylene ozonide, azobisisobutyronitrile, etc. The catalysts may be present in amounts between about 0.1% and 5% and preferably between about 0.01% and 1.0% by weight.

The particular method used in the polymerization reactions is not critical. The reaction may proceed, for example, by emulsion, suspension, or precipitation techniques or in solution.

By one method, the polymerization reaction may be carried out in solution wherein excess sulfur dioxide is the only solvent present, in which case the hydrocarbon monomers and initiator may simply be added to the sulfur dioxide or vice versa. Other solvents in which the monomeric materials are miscible, such as lower aliphatic alcohols, and aliphatic and aromatic hydrocarbons, may also be present. The unsaturated terpolymers or quaterpolymers formed in the presence of these solvents will precipitate out upon formation and may thus be directly recovered.

Another method of carrying out the polymerization is in the presence of sulfolane or a phenolic compound in which the polysulfone products are soluble or swollen. A special advantage of using these solvents in the polymerization reaction is that the reaction solution containing the unsaturated polysulfone may be directly hydrogenated without first isolating the polysulfone as will be more fully set forth below. This method of preparing the unsaturated polysulfones is not only advantageous from a practical standpoint but is unexpected since phenolic compounds are notorious for their chain transfer properties which causes them to severely limit molecular weight and behave generally as polymerization retarders or inhibitors. However, when the polymerization reaction is accomplished in a phenolic compound such as m-cresol, phenol, p-chlorophenol, and the like, polymeric sulfones of high molecular weight are obtained.

To avoid the necessity of using large amounts of sulfur dioxide the emulsion technique may be used. In that technique, the polymerization takes place generally in an aqueous medium with the aid of emulsifying agents. The emulsifying agent used is not critical and may be anionic, cationic or non-ionic. However, since the aqueous phase is present usually in greater quantity than the oil phase, the use of anionic agents resulting in an oil-in-water type emulsion may be preferred. Suitable emulsifying agents which may be used include such materials as the fatty acids and their soaps including substituted derivatives of the fatty acids and rosin acids, sulfuric esters including salts of sulfated fatty oils and alcohols, alkane sulfonates, alkarylsulfonates, mahogany and petroleum sulfonates, as well as phosphorus-containing emulsifying agents. Some specific examples include the alkali metal salts of $C_{12}$ to $C_{18}$ straight chain carboxylic acids, e.g., sodium stearate, sodium oleate, and mixtures thereof as acids obtained from tallow, coconut oil, palm oil, etc., tall oil acid soaps, sodium lauryl sulfate, sodium dodecylbenzene sulfonate, sodium di(2-ethylhexyl)orthophosphate and the like. Any amount of emulsifying or suspending agent may be used which will provide at least a relatively stable emulsion or suspension of the polymerization ingredients. Generally, from about 0.5 to about 10% by weight of emulsifying agent is sufficient.

The order in which the ingredients are added or mixed is not critical and generally any convenient method of preparing the reaction mixture may be utilized. It may be found convenient, for example, to add sulfur dioxide in liquid form at temperatures below $-10°$ C. Where such technique is used, it is preferably to have an aqueous phase which freezes at a lower temperature than $-10°$ C. wherein the presence of an alcohol or glycols with the water is satisfactory. Thus, the liquid sulfur dioxide may be added to the liquid aqueous phase conveniently without boiling. To this mixture are added the hydrocarbon monomers. The polymerization reaction temperature may be between about $-60°$ C. and about $120°$ C.

The proportion of sulfur dioxide relative to the hydrocarbon monomers used in preparing the terpolymers or quaterpolymers is not critical. It has been found that these polysulfones prepared as set forth above have an essentially perfectly alternating $\{A-SO_2\}$ structure, wherein A represents a unit derived from one molecule of a hydrocarbon monomer, regardless of the ratio of hydrocarbon:sulfur dioxide present in the reaction mixture. Thus, a very large excess of sulfur dioxide may be employed or, alternatively, an excess of hydrocarbon monomers may be used since generally the copolymerization with sulfur dioxide is much faster than the hydrocarbon homopolymerization. The most desirable ratio of reactants will vary from case to case and can be determined readily by those skilled in the art.

The relative proportions of butadiene and the other hydrocarbon monomers are determined by the concentration of the respective hydrocarbons desired in the product and by the pertinent relative reactivities. Since these reactivities are comparable, any desired ratio of hydrocarbon monomers may be generally achieved. Preferred polymers of this invention are those wherein the weight ratio of butadiene:isoprene and/or piperylene monomers is between about 20:1 and 1:20 respectively.

The molecular weight of the unhydrogenated polymeric sulfones may be controlled over a wide range by adjusting the polymerization conditions. The solubility of these polymers depends upon the isoprene and/or piperylene content. When isoprene or piperylene comprise more than about 20% by weight of the total hydrocarbon monomer content, the resulting polymers are soluble in sulfolane, fluoro-alcohols and phenolic compounds at temperatures of about $100°$ C. It is also found that once these unsaturated polysulfones are placed in a phenolic or perfluoroalcohol solvent they remain in solution even on cooling and at the temperatures of hydrogenation and lower. The unsaturated terpolymers and quaterpolymers are clear to white opaque and are stable up to temperatures of about $150°$ C.

Prior to hydrogenation the unsaturated polysulfones are swollen or dissolved in an organic polar solvent, suitable solvents being sulfolane, perfluoroalcohols such as perfluoroethanol, perfluoroisopropanol, etc. and especially the phenolic solvents such as phenol, p-chlorophenol, m-cresol, catechol, hydroquinone, pyrogallol, resorcinol, alphanapthol, etc. or mixtures thereof. Phenol, chlorophenols and the cresols are preferred. Heating to at least about $100°$ C. is generally necessary to induce solution.

The catalyst systems used in the hydrogenation reaction may be heterogenous or homogeneous. Suitable heterogeneous catalysts include for example, platinum, rhodium, osmium, ruthenium, iridium, palladium, rhenium, nickel, cobalt, copper, chromium, iron and compounds thereof such as oxides, sulfides, carbonyls, etc. These catalysts may be used alone or supported on a relatively inert material such as carbon, diatomaceous earth, alumina, silica, asbestos, pumice, etc. In order to achieve more efficient hydrogenation it may be necessary to keep the heterogeneous catalysts dispersed throughout the polymer-containing solution such as by stirring or agitating the reaction mixture. The amount of the catalyst used may be between about 0.01 and 10% by weight and preferably between about 0.1 and 5% by weight based on the polymer present.

Homogeneous catalysts offer the advantages of being rapidly dispersed throughout the reaction medium and of being less readily poisoned, thus permitting the hydrogenation of polysulfones which are only swollen by the solvents. Such homogeneous catalysts include among others the rhodium systems disclosed in copending application Ser. No. 417,482, filed Dec. 10, 1964, the descriptions of which are incorporated here by reference. Preferred catalysts of this type are the rhodium halide complexes such as trichlorotris(triphenylarsine)rhodium (III) and chlorotris(triphenylphosphine)rhodium (I). The amount of catalyst used is sufficient to provide from about 50 to 2000 p.p.m. and preferably between 100 and 1000 p.p.m. rhodium based on the polymer.

It is known that sulfur dioxide is poisonous to most catalysts thereby rendering them ineffective for hydrogenation; the presence of free sulfur dioxide should be avoided at the time of hydrogenation. This is especially important when the hydrogenation directly follows the polymerization by a method wherein an excess of sulfur dioxide is used or when polymerization is interrupted before complete conversion of the monomers.

The hydrogenation reaction temperature may be from about room temperature, i.e., approximately $20°$ C., to about $200°$ C. with temperatures between about $80°$ and $130°$ C. being preferred. The rate of hydrogenation will depend upon the particular polymer being reduced, the solvent, temperature, catalyst, solution viscosity, pressure, etc. Although hydrogenation would proceed slowly at one atmosphere of hydrogen pressure, it is normally desirable to use a large excess of hydrogen and thus hydrogen pressures of up to 10,000 p.s.i. and above may be used; the preferred range is between about 500 and 2000 p.s.i. The hydrogen may be bubbled through the polymer-containing solution or may be charged into a closed reaction vessel under pressure and then mixed with the solution by suitable means.

The hydrogenation process as disclosed herein only affects the ethylenically unsaturated linkages of the molecules and in no way reduces the stable sulfone portions of the polymer. Desirable product properties are attained by reducing the original ethylenic unsaturation by at least about 50% and up to 100%.

The hydrogenated terpolymeric and quaterpolymeric polysulfones of this invention have high crystallinity, comparable to that of the hydrogenated butadiene-sulfur dioxide copolymer, which property is surprising and unexpected. Normally the introduction of foreign or dissimilar units into a crystallizable polymer reduces crystallinity precipitously. Incorporation of as little as 5 to 10% of foreign units generally reduces crystallinity to a very low level; further incorporation of foreign units rapidly reduces crystallinity to an undetectable level. Completely hydrogenated terpolymers of butadiene, sulfur dioxide and styrene or cyclooctadiene, respectively, illustrate this typical behavior (crystallinities determined by X-ray diffraction or by differential thermal analysis) as shown in the following table:

| Mole fraction —C—C—C—C—SO$_2$ units (derived from butadiene) | Mole fraction styrene-derived units | M.P., ° C. | Crystallinity |
| --- | --- | --- | --- |
| 1.0 | 0 | 282 | Very high. |
| 0.93 | 0.07 | 267 | Very slight. |
| 0.73 | 0.27 | 223 | Nil. |

| Mole fraction —C—C—C—C—SO$_2$ units (derived from butadiene) | Mole fraction cyclooctadiene-derived units | M.P., ° C. | Crystallinity |
| --- | --- | --- | --- |
| 1.0 | 0 | 282 | Very high. |
| 0.91 | 0.09 | 267 | Trace. |
| 0.85 | 0.15 | 261 | Do. |
| 0.67 | 0.33 | 242 | Essentially amorphous. |

The striking differences and superiority of the terpolymers of this invention are dramatically evident in the persistence of high crystallinity over a very broad range of compositions:

| Mole Fraction of butadiene derived units | Mole Fraction of piperylene-derived units | M.P., ° C. | Crystallinity |
| --- | --- | --- | --- |
| 1.0 | 0.0 | 282 | Very high. |
| 0.78 | 0.22 | 250 | Do. |
| 0.63 | 0.37 | 235 | Do. |
| 0.39 | 0.61 | 202 | High. |

| Mole fraction of butadiene derived units | Mole fraction of isoprene-derived units | M.P., ° C. | Crystallinity |
| --- | --- | --- | --- |
| 1.0 | 0.0 | 282 | Very high. |
| 0.77 | 0.23 | 255 | Do. |
| 0.50 | 0.50 | 230 | High. |
| 0.30 | 0.70 | 225 | Do. |

In addition to the unusual high crystallinity property of the hydrogenated terpolymers and quaterpolymers of the invention, these products have melting points and are soluble at temperatures well below those at which decomposition occurs. The hydrogenated polymers have molecular weight of between about 20,000 and 1,000,000 as characterized by intrinsic viscosity of from about 0.5 to 5.5 dl./g., determined in a 1:1 mixture of m-cresol:p-chlorophenol at 25° C.

Although for some product properties, complete hydrogenation may be desirable, it is not necessary since any degree of residual unsaturation of less than about 50% results in stable and highly crystalline poymers. It has further been found that the melting points may be tailored, within certain limitations, to the desirable product properties by varying the degree of hydrogenation of the polymer above about 50% without greatly sacrificing the high crystallinity. Thus, these products provide materials which have a great latitude in fabrication techniques.

It is believed that the typical behavior exhibited by the terpolymers of this invention arises from an ability of butadiene-derived and isoprene- or piperylene-derived units to co-crystallize. Whatever, the reason for the persistence of high crystallinity and high melting points, the hydrogenated terpolymers of this invention, unlike other sulfone terpolymers, possess properties which are highly desirable in polymers having commercial application, especially in the formation of fibers, free films, etc., therefrom.

The following examples are provided to illustrate the manner in which the invention is carried out. It is to be understood that the examples are given for the purpose of illustration only and the invention is not to be regarded as limited to any of the specific compounds or conditions recited therein. Unless otherwise indicated, parts and percentages disclosed in the examples are given by weight. "Percent by weight" is abbreviated "% w."

EXAMPLE I

*Terpolymerization*

To a one quart bottle containing 500 ml. of a mixture of 80% water, 20% methanol, 0.5 g. of NH$_4$NO$_3$ initiator and 4 g. of sodium lauryl sulfate was added 67.8 g. of liquid sulfur dioxide, the mixture being maintained at about −11° C. A mixture of 33.4 g. butadiene and 27.0 g. of trans-piperylene was then introduced to the bottle which was then sealed; the contents were then thoroughly mixed. The reaction was allowed to proceed near room temperature for about 16 hours while the emulsion was continually agitated. The insoluble polysulfone product (119 g.) which was present as a white slurry in the reaction mixture was filtered and washed with ethanol. The product contained 25.1% w. sulfur by elemental analysis and 45% w. piperylene and 55% w. butadiene in the hydrocarbon portion by pyrolytic analysis. The product was soluble in sulfolane, p-chlorophenol and m-cresol at 100° C. and remained in solution upon cooling to room temperature.

By comparison, an alternating copolymer of butadiene and SO$_2$ was insoluble in p-chlorophenol, sulfolane and m-cresol at temperatures up to 250° C., where it decomposed rapidly.

*Hydrogenation*

A 10 gram sample of the butadiene, sulfur dioxide and piperylene terpolymeric sulfone prepared above was placed in a glass liner for a 300 ml. autoclave to which also was added 100 mg. trichlorotris(diethylphenylarsine) rhodium (III), 1.0 g. triphenylphosphine and 200 ml. of p-chlorophenol. The liner was then placed in an autoclave. After purging the vessel with hydrogen, the pressure was increased to 1000 p.s.i. and the reaction mixture heated to about 100° C. for 14 hours during which time the autoclave was constantly agitated.

The product mixture was a solution containing the hydrogenated polysulfone which was recovered by pouring the solution into methanol containing some hydrochloric acid which was being agitated in a Waring Blendor. The polysulfone, which is insoluble in the alcohol, began to precipitate out of solution and was filtered off. The polymer was returned to the Blendor and again mixed with methanol and filtered, this step being repeated until no more of the color from the catalyst could be detected in the filtrate. The dried polysulfone powder melted at 220° C. without showing any signs of instability or decomposition and possessed an intrinsic viscosity of 1.98 in 1:1 m-cresol:p-chlorophenol at 25° C. The polymer was soluble in p-chlorophenol, m-cresol, phenol, and the like at about 100° C. The polymer was completely hydrogenated as evidenced by infrared analysis.

This polymer was placed into an extrusion type spinning apparatus and melt spun into filaments at 235° C.; the filaments were stretched to 150% of original length at 25° C. to and then to 400% at 105%. They were found to have the following properties:

| | |
|---|---|
| Melting point °C | 220 |
| Intrinsic viscosity (25° C. in 1:1 m-cresol: p-chlorophenol—0.3 g./100 ml.) dl./g | 1.98 |
| Bending recovery (1) ° | 179+ |
| Tenacity (2) g. den | 3.1 |
| Elongation (3) percent | 15 |
| Tan δ (4) | 0.054 |

The explanation of the above numerals (1), (2), (3) and (4) is as follows:

(1) *Bending recovery* is a measurement of ability of a filament to recover from great deformation and thus may be considered a measure of long term resilience. The test comprises bending a polymer filament over a rod of approximately ten times the filament diameter for one minute and then allowing the filament to recover free of stress for three minutes. The angle of the residual bend of the fiber is then measured. A bending recovery of 180° C. indicates complete recovery.

(2) *Tenacity* was tested according to ASTM D 1380–59T, modified to use rate of extension of 125% per minute and four inch sample length.

(3) *Elongation* was tested according to ASTM D 1380–59T, modified to use rate of extension of 125% per minute and four inch sample length.

(4) *Tan δ* (loss tangent) is a measure of the internal friction of a specimen and hence an indicator of the short term resilience or "springiness" of fibers. The loss tangent is the ratio of energy lost to the energy retained in a cyclic process such as oscillation in a torsion pendulum. Values of tan δ were determined on single filaments with a torsion pendulum in vacuum at 0.1 c.p.s. at 23° C. See "Physical Methods of Investigating Textiles," R. Meredith and J. W. S. Heale, Textile Book Publ. (1959), Chap. 8, Sec. 8.4.

EXAMPLE II

The procedure of Example I was varied by adjusting the relative amounts of butadiene and piperylene to produce terpolymers containing about 20 to 80% mole piperylene in the hydrocarbon portion and essentially one mole of $SO_2$ per mole of diene. Ammonium persulfate and ammonium nitrate initiators were used interchangeably.

Hydrogenation according to Example 1 in mixed cresols or in p-chlorophenol provided the corresponding saturated terpolymers. All could be melt spun into fibers and pressed into stiff films.

EXAMPLE III

The procedure of Example II was repeated replacing piperylene with isoprene. Terpolymers containing about 20, 40 and 75% isoprene in the hydrocarbon portion were hydrogenated in m-cresol at 115° C. using the soluble complex rhodium catalyst system of Example I. Hydrogenation of isoprene segments proceeded more slowly than did the hydrogenation of butadiene or piperylene segments; however, hydrogenation was complete in 64 hours under 1000 p.s.i.g. hydrogen pressure. Opaque white, hard, stiff films of the polymers were pressed at 250° C. without any signs of decomposition. Fibers of the polymers were extruded and stretched following Example I. These fibers had tenacities to 2.8 g./den, excellent stiffness and good bending recovery.

EXAMPLE IV

The procedure of Example III was repeated except that the terpolymers containing 20, 30 and 40% isoprene were only partially hydrogenated (80, 70, and 60%, respectively). These products possessed a high degree of crystallinity and had melting points of about 240, 220 and 210° C. and decomposition points of 372, 352 and 343° C. respectively. By comparison the same terpolymers which were not hydrogenated decomposed rapidly at temperatures from 260–270° C.

EXAMPLE V

Water (400 cc.), methanol (100 cc.), $NH_4NO_3$ (0.5 g.), sodium lauryl sulfate (4 g.), sulfur dioxide (80 g.), butadiene (35 g.), piperylene (17.5 g.) and isoprene (12 g.) were combined as in Example I and polymerized for 10 hours. The white powdery product was isolated and washed with ethanol and dried. Ten grams of the polymer was dissolved in 200 ml. of m-cresol, and 1.0 g. of triphenylphosphine and 0.1 g. of trichlorotris-(diethylphenylarsine)rhodium III was added. This mixture was heated under 1000 p.s.i.g. hydrogen for 64 hours at 110° C. in an autoclave and subsequently precipitated with methanol containing 5% conc. HCl. The resultant quaterpolymeric sulfone showed negligble trans-olefinic double bond absorption in the infrared showing that it was substantially completely hydrogenated and had a melting point of 225° C. and could be spun into fibers and pressed into films having attractive properties.

Novel features of the methods disclosed herein for producing the claimed hydrogenated polysulfones are disclosed in greater detail and claimed in copending application Ser. No. 431,856, filed Feb. 11, 1965.

We claim as our invention:

1. A normally solid, hydrogenated copolymer of
   (1) sulfur dioxide
   (2) butadiene and
   (3) at least one of the pentadienes isoprene and piperylene, with recurring consisting essentially of recurring —$SO_2$— units alternating with recurring hydrocarbon radicals derived from one molecule of one of said dienes and having in the unhydrogenated state one ethylenically unsaturated site per diene unit, the weight ratio of butadiene-derived to pentadiene-derived radicals being between about 1:20 and 20:1, respectively, and the residual ethylenic unsaturation in said hydrogenated copolymer being less than about 50%.

2. The hydrogenated copolymer of claim 1 wherein the pentadiene-derived radicals are derived from isoprene.

3. The hydrogenated copolymer of claim 1 wherein the pentadiene-derived radicals are derived from piperylene.

4. The hydrogenated copolymer of claim 1 wherein the pentadiene-derived radicals are derived from a mixture of isoprene and piperylene.

5. A hydrogenated copolymer according to claim 1 having an intrinsic viscosity of at least 0.5 dl./g., determined in a 1:1 mixture of m-cresol and p-chlorophenol at 25° C.

6. A fiber of the terpolymer of claim 1.
7. A fiber of the terpolymer of claim 2.
8. A fiber of the terpolymer of claim 3.

References Cited
UNITED STATES PATENTS

| | | | |
|---|---|---|---|
| 2,293,023 | 8/1942 | Hills et al. | 260—79.3 |
| 2,625,525 | 1/1953 | Lynch | 260—79.3 |

JOSEPH L. SCHOFER, *Primary Examiner.*

D. K. DENENBERG, *Assistant Examiner.*